United States Patent [19]
Wreede

[11] Patent Number: 5,196,951
[45] Date of Patent: Mar. 23, 1993

[54] REFLECTION HOLOGRAMS WITHOUT TRANSMISSION GHOSTS

[75] Inventor: John E. Wreede, Azusa, Calif.

[73] Assignee: Hughes Aircraft Company, Los Angeles, Calif.

[21] Appl. No.: 721,726

[22] Filed: Jun. 26, 1991

[51] Int. Cl.⁵ .................. G02B 5/32; G03H 1/26; G03H 1/30
[52] U.S. Cl. ........................ 359/15; 359/22; 359/25
[58] Field of Search ............. 359/1, 22, 25, 30, 568, 359/15

[56] References Cited

U.S. PATENT DOCUMENTS

| | | | |
|---|---|---|---|
| 3,567,305 | 3/1971 | Collier et al. | 359/25 |
| 4,094,584 | 6/1978 | Hannan | 359/568 |
| 4,155,627 | 5/1979 | Gale et al. | 359/568 |
| 4,547,037 | 10/1985 | Case | 359/22 |
| 4,839,250 | 6/1989 | Cowan | 359/22 |

Primary Examiner—Martin Lerner
Attorney, Agent, or Firm—L. A. Alkov; W. K. Denson-Low

[57] ABSTRACT

A reflection hologram structure including a transparent substrate, and a pattern of shielded hologram containing regions and transparent regions disposed on the transparent substrate, the pattern being unresolvable to the viewer. The shielded hologram containing areas comprise hologram subregions and shielding subregions overlying the hologram subregions. The shielding subregions comprise for example, opaque regions or partially illumination transmissive regions.

11 Claims, 4 Drawing Sheets

5,196,951

REFLECTION HOLOGRAMS WITHOUT TRANSMISSION GHOSTS

BACKGROUND OF THE INVENTION

The subject invention is directed generally to slant fringe reflection holograms, and more particularly to slant fringe reflection hologram structures that are substantially free of fringe breakout flare.

Slant fringe volume reflection holograms, wherein the hologram fringes are not parallel to the surfaces of the hologram, are being utilized in head-up displays for aircraft and automobile applications. An important consideration with slant fringe reflection holograms is fringe breakout flare which is a form of transmission hologram flare. Fringe breakout flare is the result of the fringes extending to and breaking the surfaces of the volume hologram to effectively form gratings at the surfaces which act as transmission holograms that are reconstructed by light from the outside such as sunlight at the appropriate angle. Fringe breakout flare is seen by the viewer as a series of rainbow-like patterns as one would see holding any transmission grating up to a light.

The problem of flare components in general has been addressed by procedures by reducing the reflections in the hologram construction system. However, since fringe breakout flare is inherent in slant fringe holograms wherein the fringes extend to and break the surfaces of the volume hologram, the cause of fringe breakout flare could not be removed by reducing construction system imperfections. A known technique directed specifically to reducing fringe breakout flare involves reducing the contrast of the fringes near the surfaces of the volume hologram. This technique produces holograms whose characteristics are difficult to predict and/or calculate, and may not be applicable to all holographic recording materials.

SUMMARY OF THE INVENTION

It would therefore be an advantage to provide a reflection hologram structure having significantly reduced transmission fringe breakout flare.

Another advantage would be to provide a process for constructing a reflection hologram structure having significantly reduced fringe breakout flare.

The foregoing and other advantages are provided by the invention in a reflection hologram structure that includes a transparent substrate, and a pattern of shielded hologram containing regions and transparent regions disposed on the transparent substrate, the pattern being unresolvable to the viewer. The shielded hologram containing areas comprise hologram subregions and shielding subregions overlying the hologram subregions, where the shielding subregions comprise opaque regions or partially illumination transmissive regions, for example.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
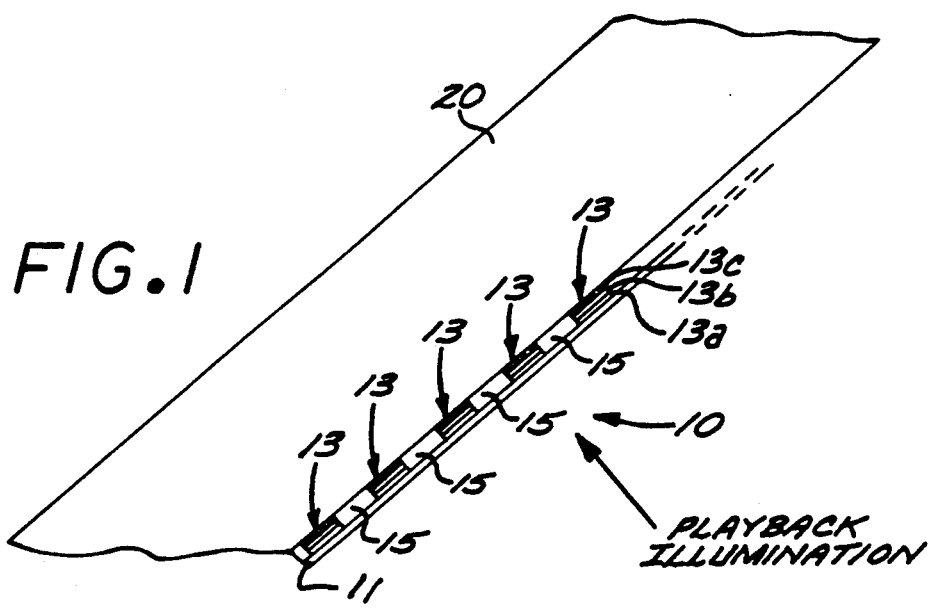
FIG. 1 is a schematic sectional view of a reflection hologram structure in accordance with the invention.

In the following detailed description and in the several figures of the drawing, like elements are identified with like reference numerals.

Referring now to FIG. 1, set forth therein is a sectional view of a reflection hologram structure 10 which, for illustrative purposes is secured to the inside surface of a vehicle windshield 20. The hologram structure includes a substrate 11 and a pattern of very small shielded hologram regions 13 and very small transparent regions 15. The pattern is unresolvable by the viewer at the intended viewing distance, and each shielded hologram region 13 comprises a hologram containing subregion 13a adjacent the substrate 11, a clear subregion 13b disposed on the hologram subregion 13a and in registration therewith, and a shielding opaque subregion 13c disposed on the clear subregion 13b and in registration therewith. The hologram containing subregions 13a collectively contain hologram information that is reconstructed pursuant to playback illumination. The clear subregions 13b are optional, and the opaque subregion 13c can be disposed directly on the hologram subregion 13a.

The hologram structure is secured to the inside surface of the windshield 20 with the shielding subregions 13c of the shielded hologram regions 13 toward the outside. The intended direction for playback illumination is as indicated in FIG. 1, whereby the playback illumination is incident on the side of the hologram containing subregions 13a that are adjacent the substrate It should be appreciated that the hologram structure 10 can be supported in other ways, including for example between the layers of a vehicle safety windshield.

Figure 2A:
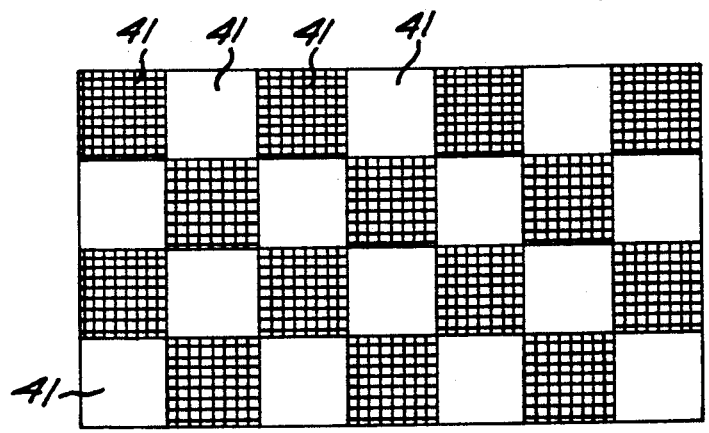
FIGS. 2A and 2B set forth illustrative examples of patterns for the shielded hologram regions and the transparent regions of the hologram structure of FIG. 1.
Figure 2B:
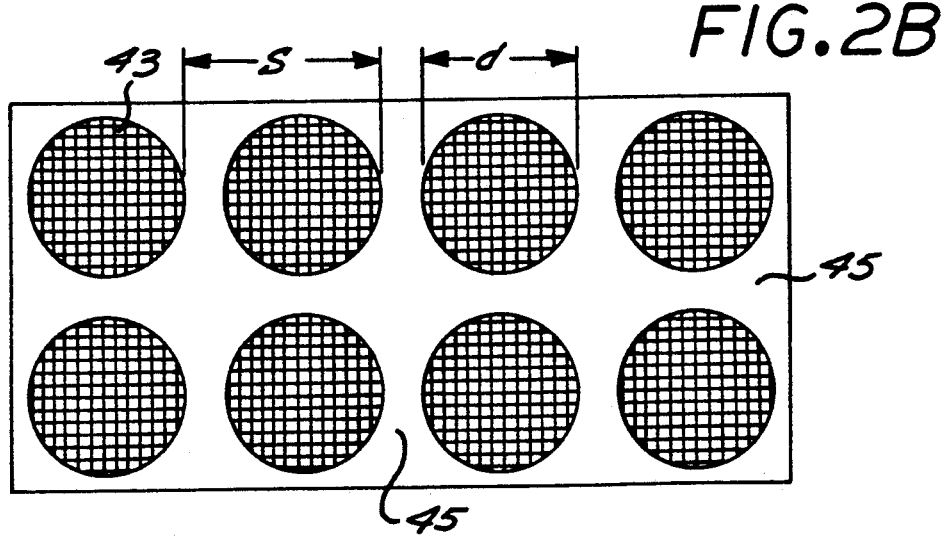

Referring now to FIGS. 2A and 2B, schematically shown therein are illustrative examples of patterns for the shielded hologram regions 13 and the transparent regions 15.

The pattern of FIG. 2A comprises a matrix of identically sized square areas 41 which define the locations of shielded hologram regions 13 and transparent regions 15. By way of illustrative example, for 50% coverage the shielded hologram regions 13 and the transparent regions 15 can be arranged in a checkerboard like pattern as represented in FIG. 2A by shaded and non-shaded areas. By way of further example, the distribution of the hologram regions 13 relative to the transparent regions 15 can be varied with position on the hologram structure so as to produce a gradual change with position of the see-through of the hologram structure, for example to provide a gradual increase in see-through at the edges thereof to make the edges less noticeable.

The pattern of FIG. 2B comprises a plurality of spaced circular dots 43, wherein the circular dots 43 or the areas 45 therebetween can be used to define locations of the shielded hologram regions. By way of illustrative example, for 50% coverage the spacing S between the dots 43 would be approximately 1.25 times the diameter d of the dots 43. For the dots 43 to be unresolvable at a viewing distance of 20 inches, for example, the maximum dot spacing is about 0.006 inches, assuming that the resolution of the human eye is about 1 min of arc. By way of further example, the sizes of the dots can be varied with position on the hologram structure so as to produce a gradual change with position of the see-through of the hologram structure, for example to provide a gradual increase in see-through at the edges thereof to make the edges less noticeable.

In the hologram structure 10 of FIG. 1, see-through is reduced to an amount equal to the percentage of the area occupied by the transparent regions relative to the total area of use (i.e., the total area occupied by the transparent regions and the shielded hologram regions). Similarly, hologram efficiency is reduced by an amount equal to the percentage of the area of the shielded hologram regions relative to the total area of use. For very high efficiency holograms, close to 50% reflective efficiency would be provided with 50% see-through. See-through can be increased by increasing the percentage of the area occupied by transparent regions, but at the cost of reduced reflective efficiency since the area of the shielded hologram regions would have to be decreased correspondingly.

In the hologram structure of FIG. the opaque subregions of the shielded hologram regions are not light transmissive and prevent illumination of the hologram containing regions by the light incident from the outside over a relatively large range of incidence angles relative to normal, thereby preventing fringe breakout flare as to outside light that is within such relatively large range of incidence angles. Outside light incident on the hologram structure at very large angles will illuminate the hologram containing regions and can produce fringe breakout flare.

As can be seen in FIG. 1, there is a range of angles for incoming light from the opaque area side which will strike the hologram subregions, which will cause a flare term whose brightness is based upon what percentage of the hologram is so illuminated. This is not usually a problem, since in most cases this flare will be near the zero order and will not enter the viewer's eye. The flare due to higher angles of incidence can be reduced by omitting the clear layer which is considered optional.

Outside light incident at 60 degrees is the maximum probable problem. For the shielded hologram structure without the clear subregions 13b, and for the typical implementation of subregions of about equal thickness, this corresponds to an angle of about 35 degrees in the hologram subregion, which would illuminate about 11.7% of the volume and surface of the hologram subregion. Both volume flare effects and surface flare effects would therefore be improved by a factor of about 8.5. In the shielded hologram structure having the clear subregions 13b, the volume and surface illuminated by off-axis outside light is greater by a factor of three (3). For the 60 degree light, this would reduce the improvement to a factor of about 2.8. However, any lower angle of light still has a greater improvement.

Figure 3:
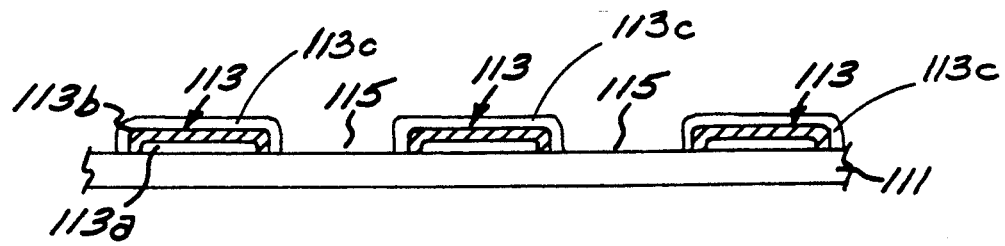
FIG. 3 is a schematic sectional view of a further reflection hologram structure in accordance with the invention.

Referring now to FIG. 3, shown therein is a hologram structure 110 which is a modification of the hologram structure of FIG. 1 and prevents illumination of the hologram containing regions by outside light at substantially all incidence angles. In particular, the hologram structure 110 includes a substrate 111, a pattern of very small shielded hologram regions 113 and very small transparent regions 115. The pattern is unresolvable by the viewer at the intended viewing distance, and each shielded hologram region 113 comprises a hologram containing subregion 113a adjacent the substrate 11, a clear subregion 113b that extends laterally beyond the edges or sides of the underlying hologram subregion 113a, and an opaque subregion 113c disposed over the clear subregion 113b, wherein the opaque subregion 113c also extends laterally beyond the sides or edges of the underlying hologram subregion 113a. The hologram containing subregions 113a collectively contain hologram information that is reconstructed pursuant to playback illumination. As with the hologram structure of FIG. 1, the clear subregions 113b are optional.

Figure 4:
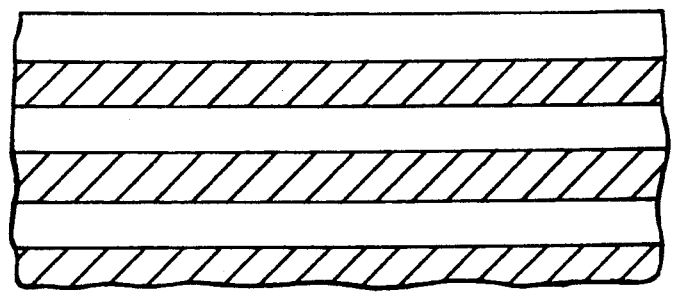
FIG. 4 sets forth an illustrative example of a pattern for the shielded hologram regions and transparent regions of the hologram structure of FIG. 3.

By way of illustrative example, the pattern of the hologram containing regions can comprise square areas or dots as shown in FIGS. 2A and 2B. As a further example, the pattern of the shielded hologram regions can comprise elongated strips as shown in the pattern of FIG. 4 wherein the shaded strips define the locations of the shielded hologram regions, for example. Since the opaque shielding regions extend beyond the sides or edges of the hologram containing regions, configuring the hologram containing areas in parallel strips can provide for better overall diffraction efficiency relative to a particular see-through characteristic. It should be appreciated that increasing the extent of the clear and opaque subregions beyond the edges of the hologram subregions will result in further reduction of flare.

Further in accordance with the invention, for applications where some transmission hologram flare can be tolerated, in the hologram structures of FIGS. 1 and 3, the shielding subregions 13c, 113c overlying on the hologram containing subregions 13a, 113a can comprise partially light transmissive subregions instead of opaque subregions so as to increase see-through while maintaining reflective efficiency, but at the sacrifice of some increase in fringe breakout flare.

Referring now to FIGS. 5A-5F, a reflection hologram structure as depicted in FIG. 1 can be made as follows. A dichromated gelatin hologram recording layer 53 supported by a glass substrate 51 is subjected to hologram forming exposure and development to provide the structure shown in FIG. 5A.

Figure 5A:
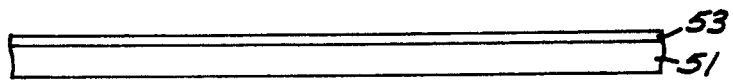
FIGS. 5A-5F are schematic sectional illustrations helpful in understanding an illustrative example of a process for making the reflection hologram structure of FIG. 1.
Figure 5B:
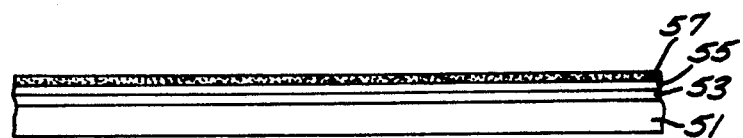

A layer of clear, non-photosensitized gelatin 55 is applied over the developed hologram layer 53, and is dried and baked. Subsequently, a layer of gelatin 57 containing a suspension of carbon particles is applied to the clear gelatin layer 55, and is dried and baked to provide the structure shown in FIG. 5B. As a result of applying the layers 55 and 57 over the developed hologram layer 53, the moisture inherent in the application of the overlying layers destroys the efficiency in the hologram layer 53 but a latent image remains in the hologram layer 53. The latent image of the hologram layer 53 is restored by reprocessing the structure of FIG. 5B in accordance with conventional processing of holographically exposed dichromated gelatin film. The "re-processing" refers to the fact that the previously processed hologram layer 53 is again processed when the structure of FIG. 5B is processed in accordance with conventional processing of holographically exposed dichromated gelatin film. U.S. application Ser. No. 07/207,084, filed Jun. 5, 1988, discloses reprocessing of multiple layer holograms, and is incorporated herein by reference.

Figure 5C:
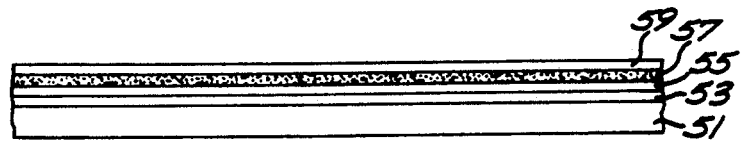
Figure 5D:
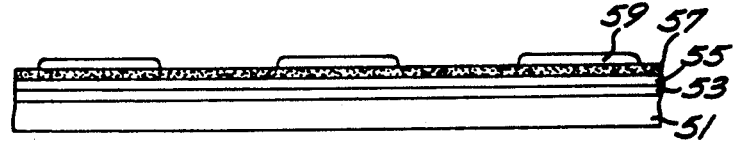

A layer of solvent based photoresist 59 is applied over the carbon suspension containing gelatin layer 57 as shown in FIG. 5C. The photoresist layer 59 is exposed in accordance with the desired shielding layer pattern of opaque and transparent areas, for example by laser scanning or by masking and exposure to actinic illumination. The exposed photoresist layer 59 is then developed to produce is then developed to produce the structure of FIG. 5D wherein the remaining areas of the photoresist layer 59 define the shielded hologram regions.

Figure 5E:
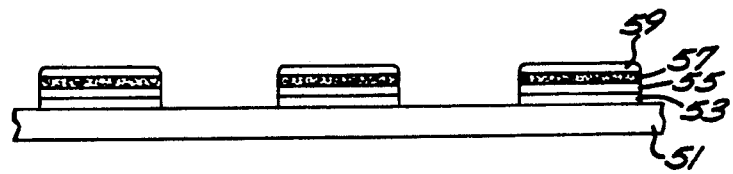
Figure 5F:

The gelatin layers 53, 55, 57 are etched in accordance with the etched photoresist layer 59 to produce the structure shown in FIG. 5E. The photoresist layer 59 is then removed, resulting in the structure shown in FIG. 5F wherein the remaining gelatin layer regions form the shielded hologram regions 13.

The hologram structure of FIG. 5E is appropriately sealed, for example with a glass cover for later installation in the intended application, for example as a head up display combiner between the layers of a windshield or onto the inside surface of a vehicle windshield. The areas of the gelatin layers that are removed define the transparent regions of the hologram structure, and can be filled with transparent material such as a UV setting optical cement that can be utilized to attach the glass cover to the hologram structure. For example, such transparent material is coated to the side of the hologram structure that contains the etched regions, and the coated hologram structure is then subjected to a vacuum to remove trapped air from both the transparent material and the remaining gelatin layers. After outgassing, the coated hologram structure is subjected to pressure to force the transparent material into the regions from which gelatin had been removed by etching.

Referring now to FIGS. 6A-6L, a reflection hologram structure as depicted in FIG. 3 can be made as follows. A dichromated gelatin hologram recording layer 53 supported by a glass substrate 53 is subjected to hologram forming exposure and development to provide the structure shown in FIG. 6A.

Figure 6A:
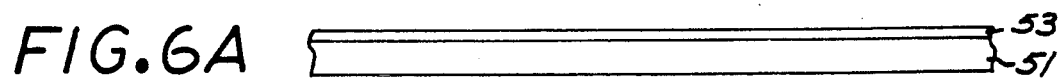
FIGS. 6A-6J are schematic sectional illustrations helpful in understanding an illustrative example of a process for making the reflection hologram structure of FIG. 3.
Figure 6B:
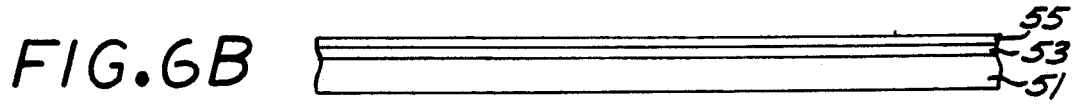
Figure 6C:
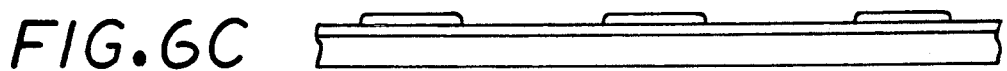
Figure 6D:
Figure 6E:
Figure 6F:

A layer of solvent based photoresist 55 is applied over the hologram layer 53 as shown in FIG. 6B. The photoresist layer 55 is exposed in accordance with the desired pattern of the hologram containing layers, for example by laser scanning or by masking and exposure to actinic illumination. The exposed photoresist layer 55 is then developed to produce the structure of FIG. 6C wherein the remaining areas of the photoresist layer 55 define the hologram containing layers. The structure of FIG. 6C is etched to remove the hologram layer from the areas uncovered by the photoresist layer to produce the structure of FIG. 6D. The photoresist layer is then removed to produce the structure of FIG. 6E.

A layer of clear, non-photosensitized gelatin 56 is applied over the etched developed hologram layer 53, and is dried and baked. Subsequently, a layer of gelatin 57 containing a suspension of carbon particles is applied to the clear gelatin layer 56, and is dried and baked to provide the structure shown in FIG. 6F The moisture inherent in the application of the layers 56, 57 destroys the efficiency in the underlying developed hologram layer 53 but a latent image remains in the hologram layer 153. The latent image of the hologram layer 53 is restored by re-processing the structure of FIG. 6F in accordance with conventional processing of holographically exposed dichromated gelatin film. The "re-processing" refers to the fact that the previously processed hologram layer 53 is again processed when the structure of FIG. 5B is processed in accordance with conventional processing of holographically exposed dichromated gelatin film.

Figure 6G:
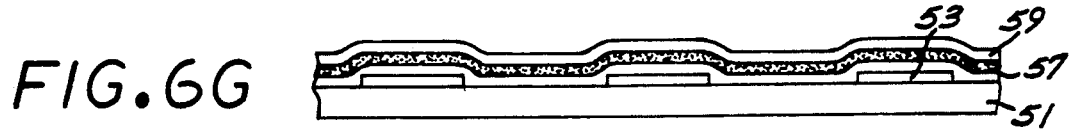
Figure 6H:
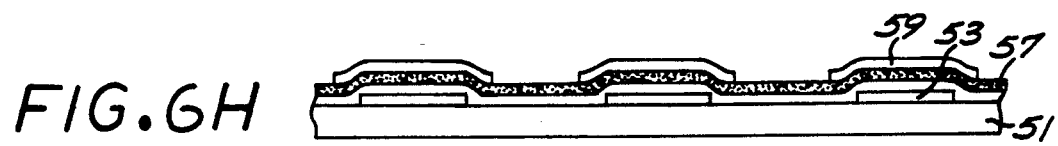

After the re-processing of the hologram layer 53, a layer of solvent based photoresist 59 is applied over the carbon suspension containing gelatin layer 57 as shown in FIG. 6G. The photoresist layer 59 is exposed in accordance with a pattern that will result in smaller open areas in the developed photoresist layer, for example by laser scanning or by masking and exposure to actinic illumination. The exposed photoresist layer 59 is then developed to produce the structure of FIG. 6H wherein the remaining areas of the photoresist layer 59 define the extent of the shielding layers of the finished hologram structure.

Figure 6I:
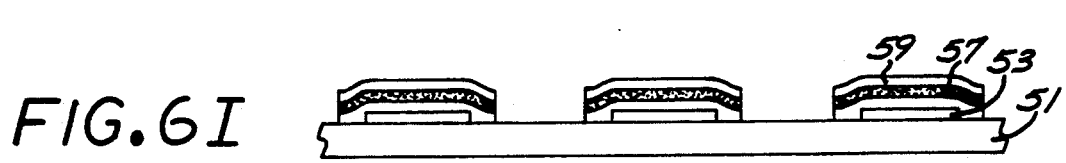

The clear gelatin layer 56 and the carbon suspension gelatin layer 157 are etched in accordance with the etched photoresist layer to produce the structure shown in FIG. 6I. The photoresist layer 59 is then removed, resulting in the structure shown in FIG. 6J wherein the remaining gelatin layers form the shielded hologram regions.

Alternatively, the clear layer can be etched prior to application of the opaque layer which would be etched separately. With the separate etching of the opaque layer, the etch pattern for the opaque layer can be configured so that opaque subregions extend laterally beyond the underlying clear subregions.

It should be appreciated that in the previously described step of re-processing can be performed alternatively after the clear gelatin layer 56 and the carbon suspension layer 57 are masked and etched.

Figure 6J:
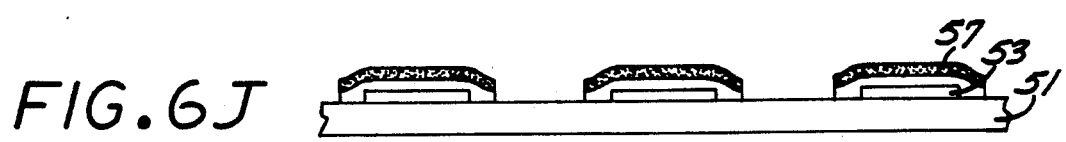

The hologram structure of FIG. 6J is appropriately sealed and installed as discussed previously in conjunction with FIG. 5E relative to a process for making the hologram structure of FIG. 1.

The foregoing has been a disclosure of reflection hologram structures that advantageously have significantly reduced fringe breakout flare, and processes for making such reflection holograms. The disclosed reflection structures have the further benefit of preventing flare resulting from imperfections in the construction system.

Although the foregoing has been a description and illustration of specific embodiments of the invention, various modifications and changes thereto can be made by persons skilled in the art without departing from the scope and spirit of the invention as defined by the following claims.

What is claimed is:

1. A reflection hologram structure comprising:
   a transparent substrate;
   a pattern of hologram containing regions disposed on the transparent substrate; and
   fixed predetermined shielding regions disposed over said hologram containing regions for said reflection hologram structure.

2. The reflection hologram structure of claim 1 wherein said shielding regions comprise opaque regions disposed on said hologram containing regions and in registration therewith.

3. The reflection hologram structure of claim 1 wherein said shielding regions comprise partially light transmission regions disposed on said hologram containing regions and in registration therewith.

4. The reflection hologram structure of claim 1 wherein said shielding regions comprise opaque regions of greater lateral extent than said hologram containing regions.

5. The reflection hologram structure of claim 1 wherein said shielding regions comprise partially light transmission regions of greater lateral extent than said hologram containing regions.

6. A method for making a reflection hologram structure comprising the steps of:
   exposing and developing a hologram recording layer;
   applying an illumination shielding layer over the developed hologram layer; and
   removing selected areas of the illumination shielding layer and the hologram recording layer.

7. The method of claim 6 wherein the illumination shielding layer comprises an opaque layer.

8. The method of claim 6 wherein the illumination shielding layer comprises a partially light transmissive layer.

9. A method for making a reflection hologram structure comprising the steps of:
   exposing and developing a hologram recording layer;
   removing selected areas of the hologram recording layer to provide hologram containing regions and open areas;
   applying an illumination shielding layer over the hologram containing regions and the open areas; and
   removing selected areas of the illumination shielding layer such that the hologram containing regions are covered by illumination shielding regions.

10. The method of claim 9 wherein the illumination shielding layer comprises an opaque layer.

11. The method of claim 9 wherein the illumination shielding layer comprises a partially light transmissive layer.

* * * * *